(12) United States Patent
Nimmagadda et al.

(10) Patent No.: US 10,944,793 B2
(45) Date of Patent: Mar. 9, 2021

(54) RULES-BASED NETWORK SECURITY POLICY MODIFICATION

(71) Applicant: Juniper Networks, Inc., Sunnyvale, CA (US)

(72) Inventors: Srinivas Nimmagadda, San Jose, CA (US); Rakesh Kumar, San Ramon, CA (US); Prakash T. Seshadri, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 271 days.

(21) Appl. No.: 15/637,789

(22) Filed: Jun. 29, 2017

(65) Prior Publication Data

US 2019/0007453 A1      Jan. 3, 2019

(51) Int. Cl.
*G06F 21/60* (2013.01)
*H04L 12/851* (2013.01)
(Continued)

(52) U.S. Cl.
CPC .......... *H04L 63/20* (2013.01); *G06F 21/604* (2013.01); *G06N 5/025* (2013.01); *H04L 47/10* (2013.01);
(Continued)

(58) Field of Classification Search
CPC ......... H04L 63/20; H04L 67/10; H04L 47/70; H04L 63/08; H04L 63/10; H04L 63/0227;
(Continued)

(56) References Cited

U.S. PATENT DOCUMENTS 7,505,463 B2 * 3/2009 Schuba .................. G06N 5/025
370/392
8,429,255 B1 4/2013 Khan et al.
(Continued)

FOREIGN PATENT DOCUMENTS

| CN | 1760791 A | 4/2006 |
|---|---|---|
| CN | 101505302 A | 8/2009 |
| WO | 104883347 A | 9/2015 |
| WO | WO 2016/186605 A1 | 11/2016 |

OTHER PUBLICATIONS

Carolyn A. Brodie, An Empirical Study of Natural Language Parsing of Privacy Policy Rules Using the Sparcle Policy Workbench , 2006, Soups '06 Proceedings of the second symposium on Usable privacy and security pp. 8-19, Sec 3, 3.1, 4, available at https://dl.acm.org/citation.cfm?doid=1143120.1143123 (Year: 2006).*
(Continued)

*Primary Examiner* — Jung W Kim
*Assistant Examiner* — Howard H. Louie
(74) *Attorney, Agent, or Firm* — Harrity & Harrity, LLP

(57) ABSTRACT

A device may receive first information associated with a set of security rules. The first information may identify a set of security actions a device is to implement when the set of security rules applies to traffic. The device may determine a manner in which the set of security rules is to apply using the first information. The device may determine whether the manner in which the set of security rules is to apply and an intent of a network security policy or a manner in which a set of previously defined security rules is to apply match to determine whether the set of security rules conflicts with the network security policy or whether the set of security rules and the set of previously defined security rules are related. The device may perform an action.

20 Claims, 7 Drawing Sheets

(51) Int. Cl.
*H04L 12/801* (2013.01)
*H04L 12/813* (2013.01)
*H04L 29/06* (2006.01)
*G06N 5/02* (2006.01)

(52) U.S. Cl.
CPC .......... *H04L 47/20* (2013.01); *H04L 47/2441* (2013.01)

(58) Field of Classification Search
CPC . H04L 63/1441; H04L 63/0236; H04L 47/10; H04L 47/20; H04L 47/2441; H04L 12/851; H04L 12/801; H04L 12/813; G06N 20/00; G06N 7/005; G06N 3/04; G06N 5/025; G06F 21/604; G06F 21/60
See application file for complete search history.

(56) References Cited

U.S. PATENT DOCUMENTS

| | | | |
|---|---|---|---|
| 2004/0177139 A1* | 9/2004 | Schuba | H04L 41/0873 709/223 |
| 2007/0174106 A1 | 7/2007 | Aniszczyk et al. | |
| 2007/0283411 A1 | 12/2007 | Paramasivam et al. | |
| 2018/0188704 A1* | 7/2018 | Cella | H04L 67/10 |

OTHER PUBLICATIONS

Ai-Shaer et al., "Firewall Policy Advisor for Anomaly Discovery and Rule Editing", Apr. 4, 2003, 14 pages, XP002463654.
Extended European Search report corresponding to EP 18175124.9 dated Oct. 23, 2018, 12 pages.

* cited by examiner

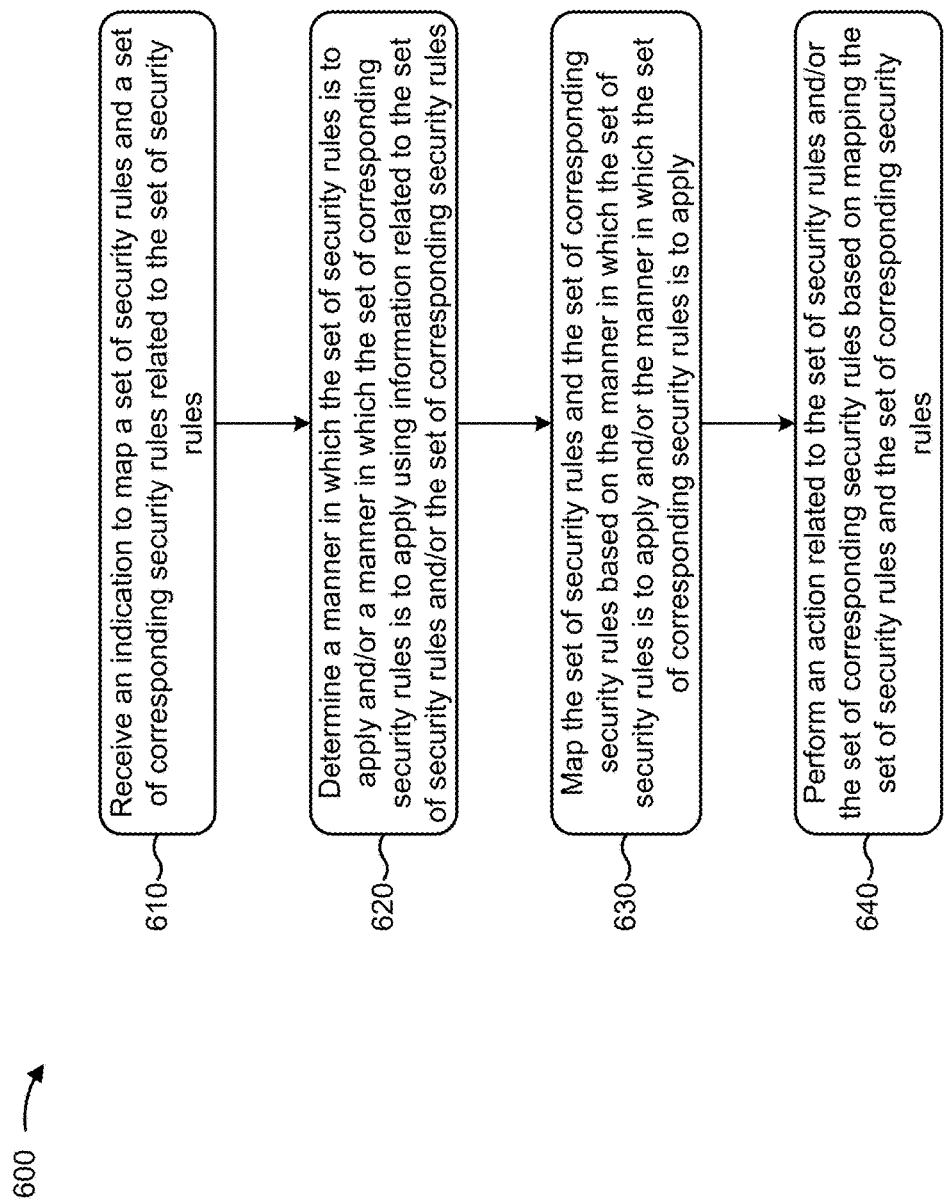

RULES-BASED NETWORK SECURITY POLICY MODIFICATION

BACKGROUND

A network security policy may include a document that outlines rules for computer network access, network traffic, and/or the like. The rules may govern data access, web-browsing habits, use of passwords and encryption, email attachments, and/or the like. The network security policy may specify the rules for individuals or for groups of individuals throughout a company.

SUMMARY

According to some possible implementations, a device may comprise one or more processors to receive first information associated with a set of security rules. The first information may be received from another device and may be used to modify a network security policy. The network security policy may include a set of previously defined security rules. The network security policy may have an intent that is independent of the set of previously defined security rules included in the network security policy. The one or more processors may determine a manner in which the set of security rules is to apply using the first information. The manner in which the set of security rules is to apply may be used to determine whether the set of security rules conflicts with the intent of the network security policy or is related to the set of previously defined security rules. The one or more processors may determine whether the manner in which the set of security rules is to apply and the intent of the network security policy or a manner in which the set of previously defined security rules is to apply match using the first information and second information. The second information may be associated with the network security policy. The second information may be associated with the set of previously defined security rules. The one or more processors may perform an action based on determining whether the manner in which the set of security rules is to apply and the intent of the network security policy or the manner in which the set of previously defined security rules is to apply match. The action may relate to modifying the network security policy based on the set of security rules.

According to some possible implementations, a non-transitory computer-readable medium may store one or more instructions that, when executed by one or more processors, cause the one or more processors to receive first information associated with a set of security rules. The first information may identify traffic to which the set of security rules is to apply, or a set of security actions a device is to implement when the set of security rules applies to traffic. The one or more instructions, when executed by the one or more processors, may cause the one or more processors to determine a manner in which the set of security rules is to apply using the first information. The manner in which the set of security rules is to apply may be determined using a technique to process the first information. The one or more instructions, when executed by the one or more processors, may cause the one or more processors to determine whether the manner in which the set of security rules is to apply and an intent of a network security policy or a manner in which a set of previously defined security rules is to apply match to determine whether the set of security rules conflicts with the network security policy or whether the set of security rules and the set of previously defined security rules are related. The one or more instructions, when executed by the one or more processors, may cause the one or more processors to perform an action based on determining whether the manner in which the set of security rules is to apply and the intent of the network security policy or the manner in which the set of previously defined security rules is to apply match. The action may relate to modifying the network security policy based on the set of security rules.

According to some possible implementations, a method may comprise receiving, by a device, first information associated with a set of security rules. The first information may permit identification of traffic to which the set of security rules applies, or a set of security actions the device is to perform with respect to the traffic. The method may comprise determining, by the device, a manner in which the set of security rules is to apply using the first information. The method may comprise determining, by the device, whether the manner in which the set of security rules is to apply and an intent of a network security policy or a manner in which a set of previously defined security rules is to apply match. The intent of the network security policy or the manner in which the set of previously defined security rules is to apply may be determined using second information associated with the set of previously defined security rules or the network security policy. The first information and the second information may be compared to determine whether the manner in which the set of security rules is to apply and the intent of the network security policy or the manner in which the set of previously defined security rules is to apply match. The method may comprise performing, by the device, an action based on determining whether the manner in which the set of security rules is to apply and the intent of the network security policy or the manner in which the set of previously defined security rules is to apply match.

BRIEF DESCRIPTION OF THE DRAWINGS

FIG. 6 is a flow chart of an example process for an intent-based network security policy modification.

DETAILED DESCRIPTION

The following detailed description of example implementations refers to the accompanying drawings. The same reference numbers in different drawings may identify the same or similar elements.

A network security policy may include a set of rules related to network access, traffic permitted via a network, and/or the like. A network security policy may be modified over time as rules, various exceptions, and/or the like are added to and/or removed from the network security policy. Modifications to the network security policy may be made in an unorganized manner, thereby preventing a network administrator from determining an original intent of the network security policy, a manner in which the original intent of the network security policy was modified, and/or the like, thereby decreasing network security of a network associated with the network security policy (e.g., via increased difficulty of managing a network security policy). In addition, a network administrator may lack a computer-based technique for managing a network security policy based on an intent of the network security policy.

Some implementations, described herein, provide a network device that is capable of determining an intent of a network security policy and/or a manner in which various security rules associated with the network security policy are to apply and mapping the various security rules, such that, for example, security rule exceptions are mapped to corresponding security rules, a first security rule is mapped to a second security rule that is related to the first security rule, and/or the like. This facilitates improved management of the network security policy via tracking of changes to an intent of the network security policy, thereby improving security of a network associated with the network security policy. In addition, this conserves processing resources that would otherwise be consumed due to reduced network security and/or use of a network in an unintended manner. Further, this increases an efficiency of analyzing a network security policy to determine a manner in which an intent of a network security policy has changed, when a network is under attack (e.g., to permit a network device or a network administrator to quickly identify and modify a security rule during an attack), and/or the like.

Figure 1A:
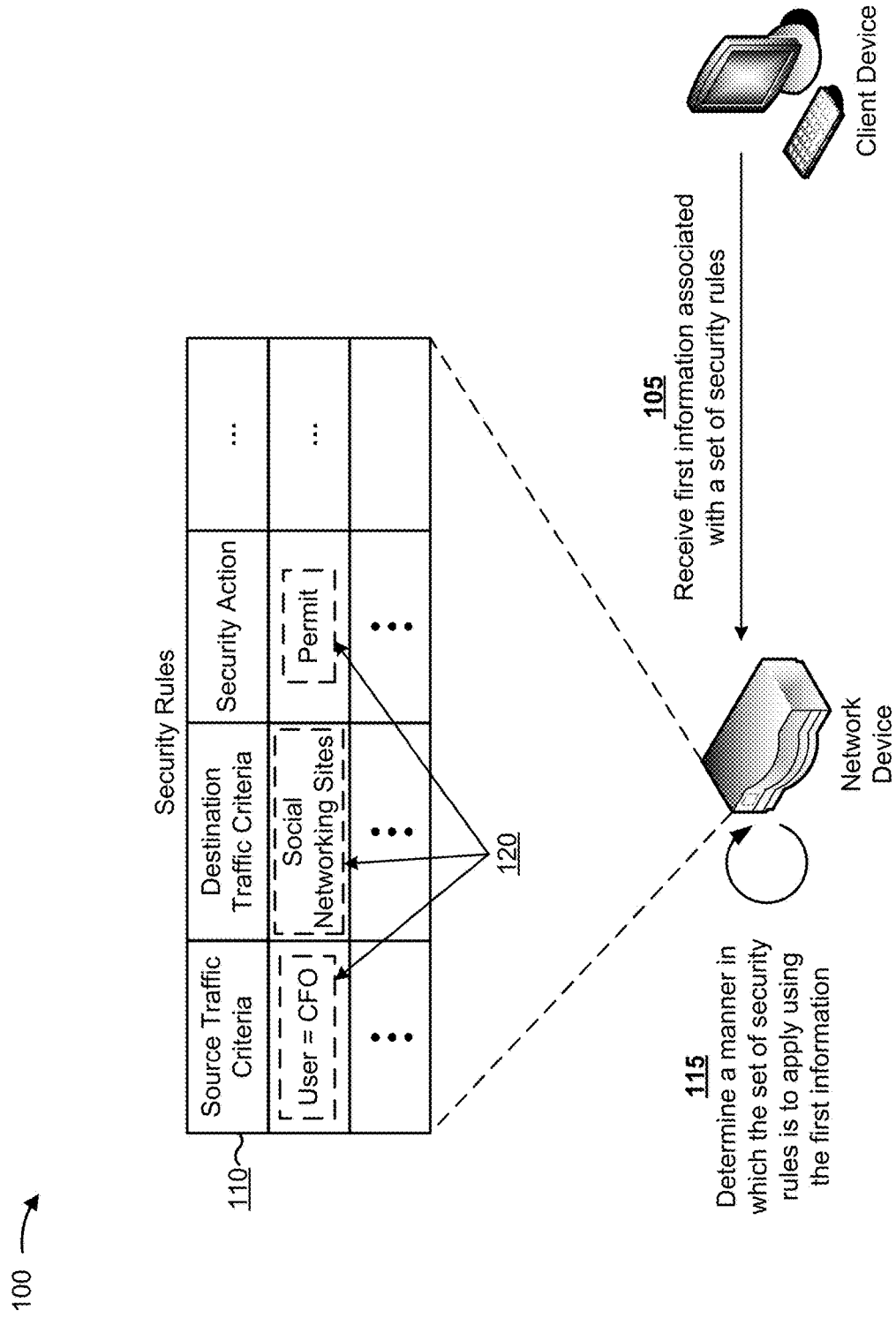
FIGS. 1A and 1B are diagrams of an overview of an example implementation described herein.
Figure 1B:
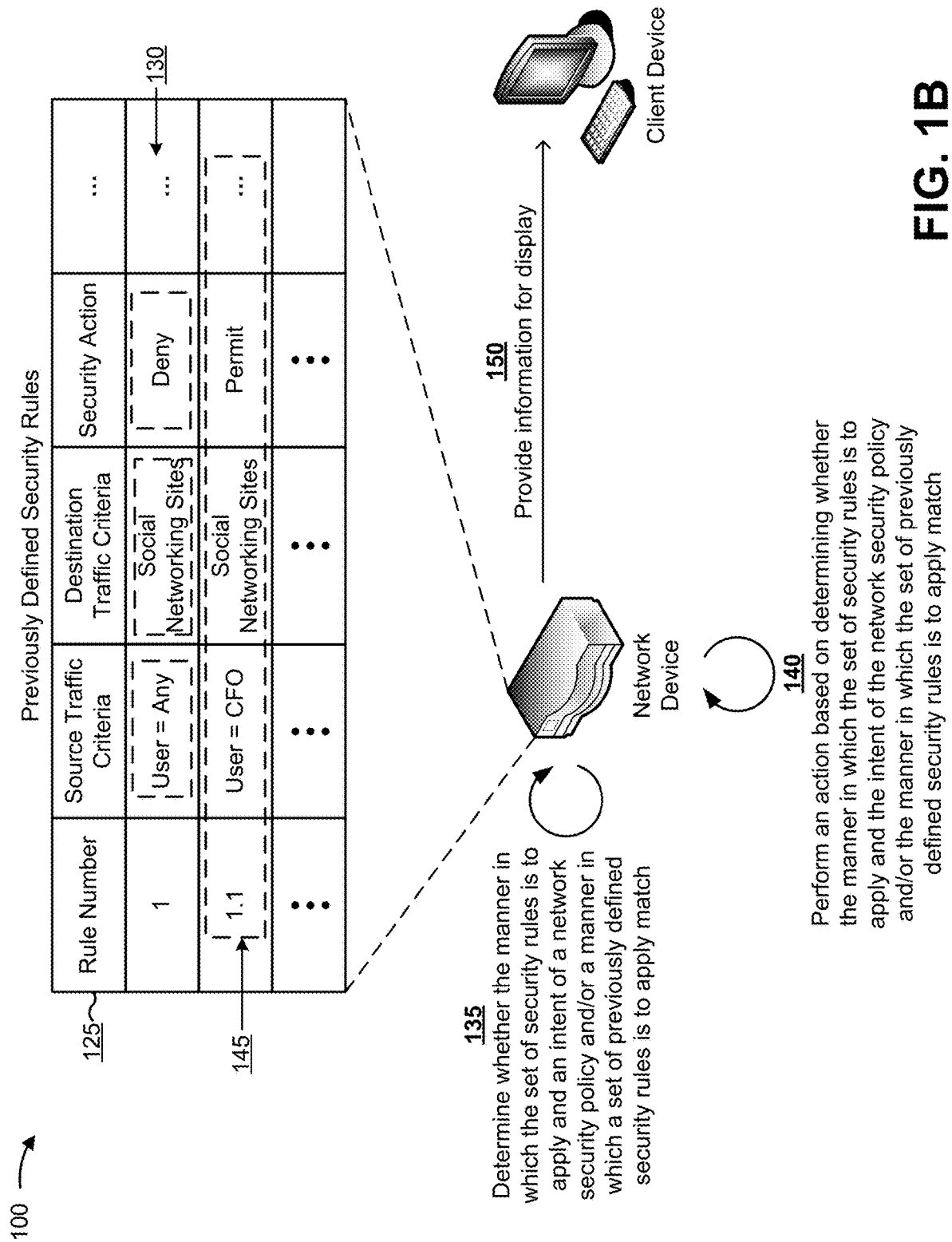

FIGS. 1A and 1B are diagrams of an overview of an example implementation 100 described herein. As shown in FIG. 1A, example implementation 100 may include a network device and a client device. FIGS. 1A and 1B show an example of determining an intent of a network security policy and/or a manner in which a security rule is to apply (e.g., a new security rule to be added to a network security policy) and mapping the security rule to an existing security rule based on the intent of the network security policy, a manner in which the security rule is to apply, and/or a manner in which the existing security rule is to apply.

As shown in FIG. 1A, and as shown by reference number 105, the network device may receive, from the client device, first information associated with a set of security rules. A security rule may include a rule related to network access, traffic permitted via a network, and/or the like. In some implementations, a set of security rules may form a network security policy that is applied to network traffic, network access, and/or the like (e.g., of an organization).

As further shown in FIG. 1A, and as shown by reference number 110, a security rule may include first information that indicates a manner in which the security rule is to apply to traffic. As shown, the first information may identify source traffic criteria (e.g., a source of traffic to which the security rule applies), destination traffic criteria (e.g., a destination of traffic to which the security rule applies), information that identifies a security action (e.g., an action the network device is to perform when the network device determines that the security rule is to apply to traffic), and/or the like.

As further shown in FIG. 1A, and as shown by reference number 115, the network device may determine a manner in which the set of security rules is to apply using the first information. For example, the network device may parse (e.g., analyze) first information related to the set of security rules to determine the manner in which the set of security rules is to apply. In this case, the network device may use a natural language processing technique to parse first information related to the set of rules to identify a term, a phrase, and/or the like that identifies a manner in which the set of security rules is to apply.

As further shown in FIG. 1A, and as shown by reference number 120, the network device may parse the first information associated with a particular security rule to identify the manner in which the set of security rules is to apply. For example, the network device may determine that the security rule applies to a particular employee based on the first information identifying that the security rule applies to a chief financial officer (CFO) rather than all employees. As another example, the network device may determine that the security rule applies to traffic destined for social networking sites (e.g., rather than other types of websites, such as news websites, company websites, etc.). As yet another example, the network device may determine that the network device is to permit traffic when the security rule applies (e.g., when the traffic is from the CFO and is destined for a social networking site). The network device may determine that the security rule is intended to be a new security rule or an exception to an existing security rule based on the security rule applying to a subset of employees.

As shown in FIG. 1B, and as shown by reference number 125, the network device may store a set of previously defined security rules that form a network security policy. For example, the network device may use the network security policy to manage traffic via a network associated with the network device. As further shown in FIG. 1B, and by reference number 130, the network device may determine an intent of a network security policy and/or a manner in which a previously defined security rule is to apply, in a manner similar to that described above (e.g., by parsing second information related to the network security policy and/or the previously defined security rule).

As further shown in FIG. 1B, and as shown by reference number 135, the network device may determine whether the manner in which the set of security rules, received from the client device, is to apply and an intent of a network security policy and/or a manner in which a set of previously defined security rules is to apply match (e.g., to determine whether the set of security rules conflicts with an intent of the network security policy, is related to the set of previously defined security rules, etc.). In some implementations, the network device may determine whether the manner in which the set of security rules is to apply and an intent of a network security policy and/or a manner in which a set of previously defined security rules is to apply match by comparing a manner in which a set of received security rules is to apply and an intent of a network security policy and/or a manner in which a set of previously defined security rules is to apply.

For example, the network device may determine that the set of previously defined security rules and the set of received security rules both apply to traffic destined for the same destination and/or the same type of destination (e.g., both apply to traffic destined for social networking sites). In this case, the network device may determine that the set of security rules and the set of previously defined security rules are related based on determining that the set of previously defined security rules and the set of received security rules both apply to traffic destined for the same destination and/or the same type of destination. Additionally, or alternatively, and as another example, the network device may determine that the set of security rules conflicts with an intent of a network security policy to deny traffic to social networking sites (e.g., based on the set of security rules permitting traffic to social networking sites).

In some implementations, the network device may determine that the set of security rules and the set of previously defined security rules are related based on the set of previously defined security rules and the set of received security rules being associated with the same source of traffic and/or the same type of source of traffic. For example, the network device may determine that the set of previously defined security rules and the set of received security rules are related based on determining that the set of previously defined security rules applies to all employees, and the set of received security rules applies to a subset of the employees (e.g., a CFO).

In some implementations, the network device may determine that the set of received security rules and the set of previously defined security rules are associated with different security actions. In some implementations, while the rules are related based on being associated with the same destination of traffic and/or the same type of source of traffic (e.g., employees), the network device may determine that the set of received security rules is to be an exception to the set of previously defined security rules based on the set of received security rules being associated with a subset of the same source of traffic as the set of previously defined security rules and/or being associated with a different security action. Additionally, or alternatively, the network device may determine that the set of security rules is to be added to the network security policy as an exception to the network security policy based on the set of security rules conflicting with the intent of the network security policy.

As further shown in FIG. 1B, and as shown by reference number 140, the network device may perform an action based on determining whether the manner in which the set of security rules is to apply and the intent of the network security policy and/or the manner in which the set of previously defined security rules is to apply match. For example, the network device may perform an action to implement the set of received security rules, to include the set of received security rules in a network security policy, to identify conflicting security rules, to replace a security rule, to update a security rule, and/or the like.

As a particular example of an action, and as shown by reference number 145, the network device may include a particular security rule of the set of received security rules in a network security policy as an exception to a particular previously defined security rule of the set of previously defined security rules. In this case, the network device may include information in the network security policy that indicates that the particular received security rule is an exception to the particular previously defined security rule, an exception to an intent of a network security policy, and/or the like. For example, the information may permit a network administrator to quickly and easily determine that the particular received security rule is an exception, or related, to the particular previously defined security rule (e.g., by generating a rule number that indicates that the particular received security rule is an exception to the particular previously defined security rule, shown as "1.1" where "1.1" indicates that the particular received security rule is an exception, or related, to previously defined security rule "1").

As another example of an action, and as shown by reference number 150, the network device may provide information for display indicating that the network security policy was modified with the set of received security rules, that the particular received security rule of the set of received security rules is an exception to the particular previously defined security rule, and/or the like.

Some implementations, described herein, provide a network device that is capable of determining an intent of a network security policy and/or a manner in which various security rules associated with the network policy are to apply and mapping the various security rules, such that security rule exceptions are mapped to corresponding security rules, a first security rule is mapped to a second security rule that is related to the first security rule, and/or the like. This facilitates improved management of the network security policy via tracking of changes to an intent of the network security policy, thereby improving security of a network associated with the network security policy. In addition, this conserves processing resources that would otherwise be consumed due to reduced network security and/or use of a network in an unintended manner. Further, this increases an efficiency of analyzing a network security policy, such as to determine a manner in which an intent of a security policy has changed, when a network is under attack (e.g., to permit a network device or a network administrator to quickly identify and modify a security rule during an attack), and/or the like. Further, this permits processing of security rules efficiently without human subjectivity, thereby conserving processing resources with fewer errors relative to processing by a human actor.

As indicated above, FIGS. 1A and 1B are provided merely as an example. Other examples are possible and may differ from what was described with regard to FIGS. 1A and 1B. For example, although FIGS. 1A and 1B show a single network device and a single client device, in practice, there may be hundreds, thousands, millions, etc. of network devices and/or client devices. As another example, in practice, there may be thousands, millions, billions, etc. of security rules that the network device may process. In this way, the network device may process a set of security rules that cannot be processed manually or objectively by a human actor.

Figure 2:
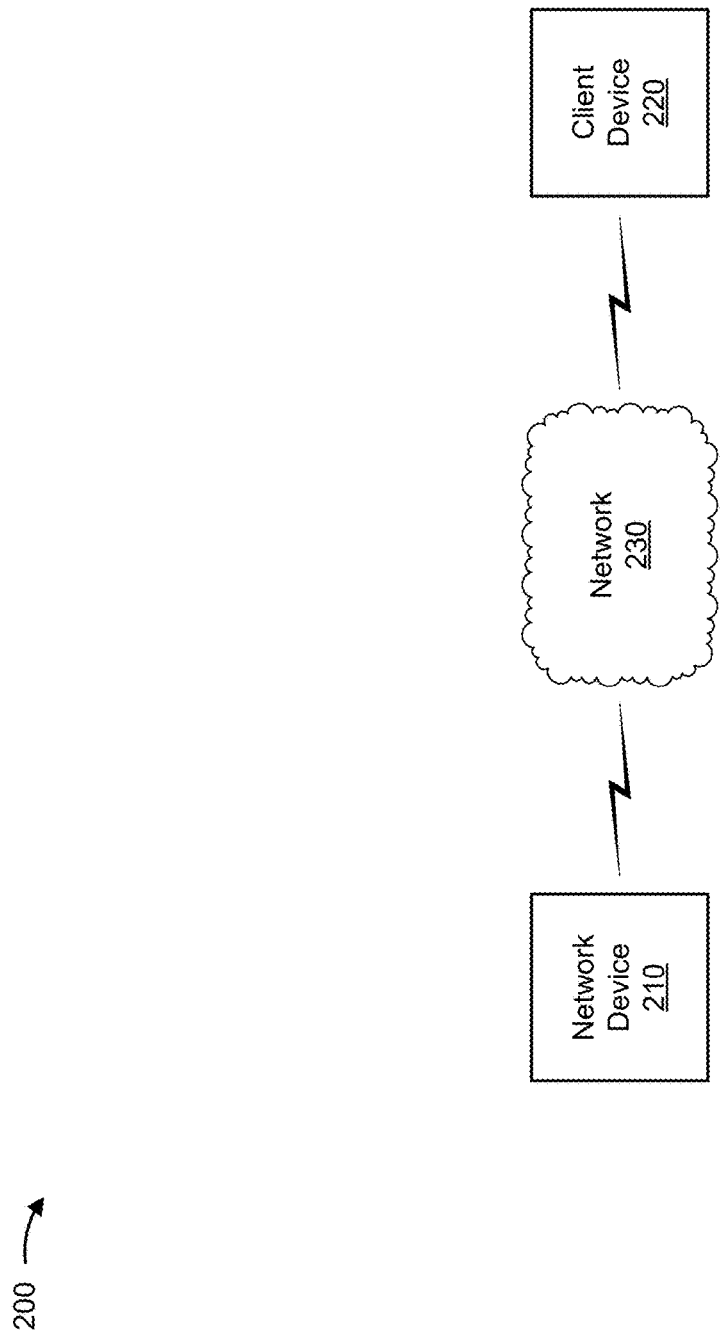
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a client device 220, and a network 230. Devices of environment 200 may interconnect via wired connections, wireless connections, or a combination of wired and wireless connections.

Network device 210 includes one or more devices (e.g., one or more traffic transfer devices) capable of receiving, storing, processing, generating, and/or providing information related to a security rule and/or a network security policy. For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may receive, from client device 220, information related to a security rule to be added to a network security policy, as described elsewhere herein. Additionally, or alternatively, network device 210 may determine a manner in which the security rule and/or another security rule included in the network security policy are to apply and/or may add the security rule to the network security policy based on determining the manner in which the security rule and/or the other security rule are to apply, as described elsewhere herein. In some implementations, network device 210 may be a physical device implemented with a housing, such as a chassis. In some implementations, network device 210 may be a virtual device implemented by one or more computer devices of a cloud computing environment or a data center. Although FIG. 2 shows a single network device 210, in practice, there may be hundreds, thousands, millions, etc. of network devices 210.

Client device 220 includes one or more devices capable of receiving, generating, storing, processing, and/or providing information related to a security rule and/or a network security policy. For example, client device 220 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar device. In some implementations, client device 220 may provide, to network device 210, information identifying a security rule input by a user of client device 220, as described elsewhere herein. Additionally, or alternatively, client device 220 may receive, from network device 210, information that identifies a result of adding the security rule to a network security policy, as described elsewhere herein. Although FIG. 2 shows a single client device 220, in practice, there may be hundreds, thousands, millions, etc. of client devices 220.

Network 230 includes one or more wired and/or wireless networks. For example, network 230 may include a cellular network (e.g., a long-term evolution (LTE) network, a code division multiple access (CDMA) network, a 3G network, a 4G network, a 5G network, or another type cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
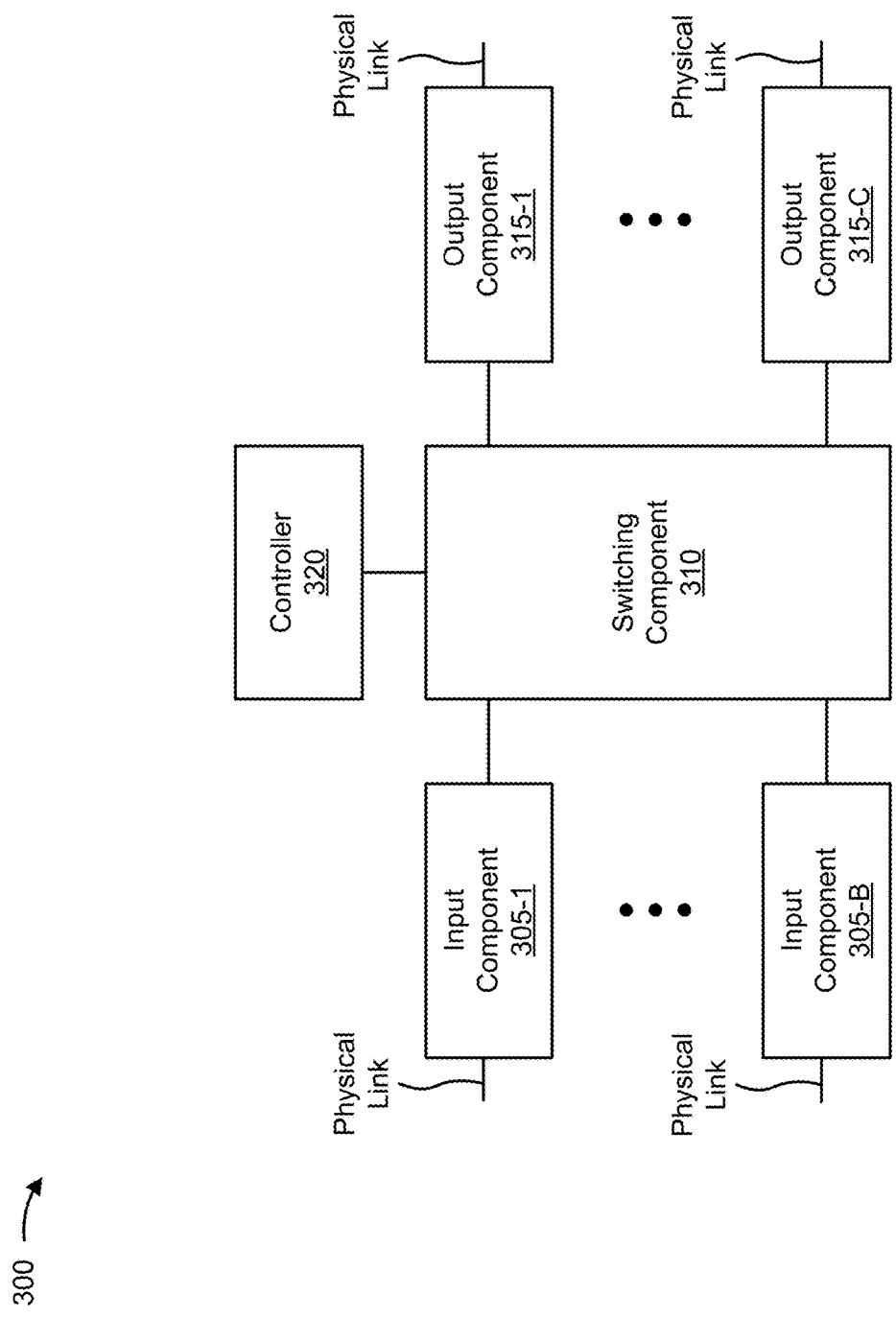
FIG. 3 is a diagram of example components of one or more devices of FIG. 2.

FIG. 3 is a diagram of example components of a device 300. Device 300 may correspond to network device 210 and/or client device 220. In some implementations, network device 210 and/or client device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C(C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
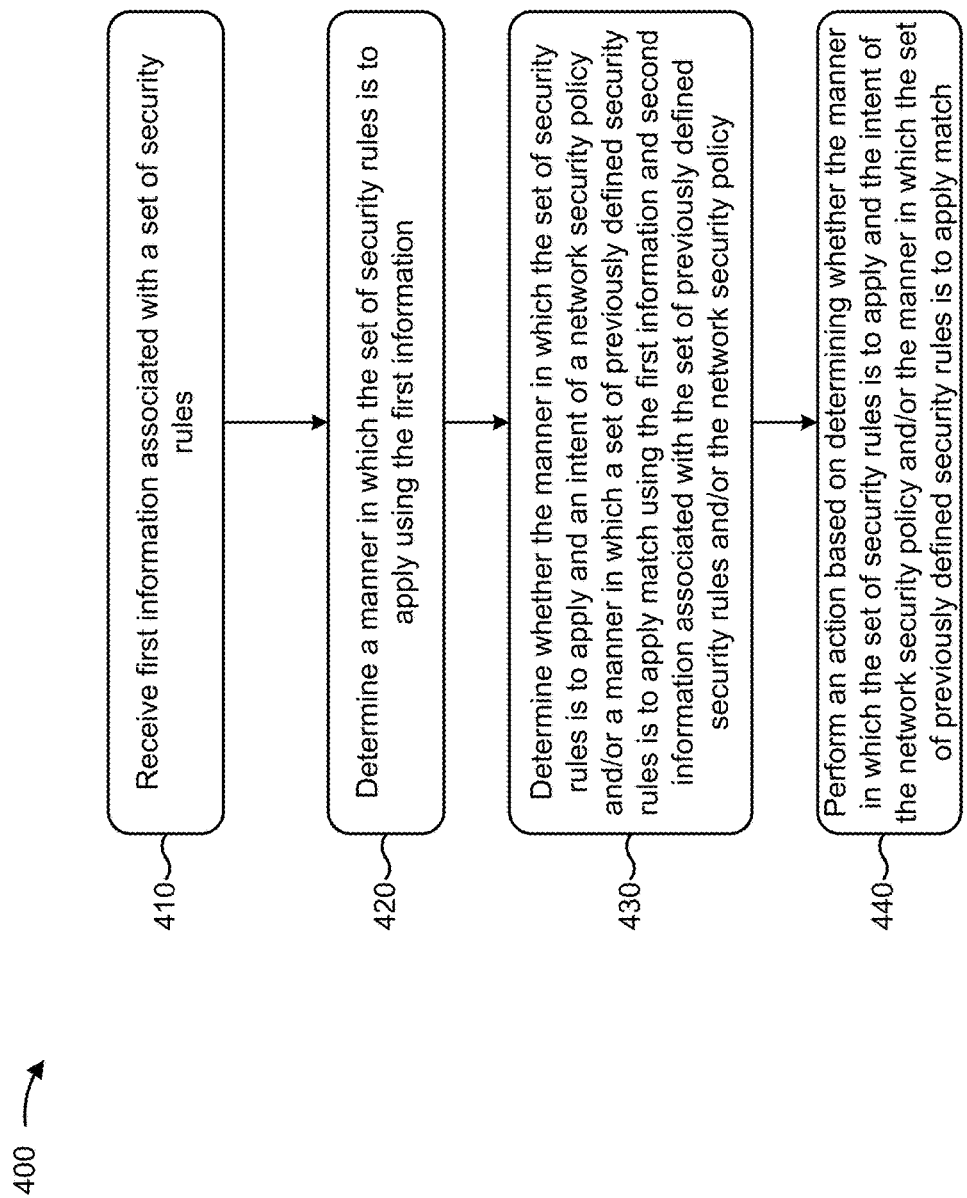
FIG. 4 is a flow chart of an example process for an intent-based network security policy modification.

FIG. 4 is a flow chart of an example process 400 for an intent-based network security policy modification. In some implementations, one or more process blocks of FIG. 4 may be performed by network device 210. In some implementations, one or more process blocks of FIG. 4 may be performed by another device or a group of devices separate from or including network device 210, such as client device 220. FIG. 4 shows an example process related to receiving information related to a security rule to be added to a network security policy and determining a manner in which the security rule is to apply, an intent of the network security policy, and/or a manner in which another security rule included in the network security policy is to apply to determine a manner in which the security rule is to be added to the network security policy, similar to that described above with regard to FIGS. 1A and 1B.

As shown in FIG. 4, process 400 may include receiving first information associated with a set of security rules (block 410). For example, network device 210 may receive first information associated with a set of security rules to be added to a network security policy. In some implementations, network device 210 may receive the first information periodically, according to a schedule, based on a user of client device 220 inputting the first information, based on requesting the first information (e.g., from client device 220), and/or the like.

In some implementations, the first information may include information related to application of a security rule, such as information that identifies a source of traffic to which the security rule is to apply (e.g., a user, an application, an application category, a website, a geographic location, a computer device, a source network address, etc.), information that identifies a destination of traffic to which the security rule is to apply (e.g., an application, an application category, a website, a geographic location, a user, a server device, a destination network address, etc.), a security action that network device 210 is to perform when the security rule applies to traffic (e.g., permit the traffic, deny the traffic, log the traffic, reroute the traffic, quarantine the traffic, etc.), and/or the like.

In some implementations, the first information may include several items of information regarding a security rule, such as five or more items of information, ten or more items of information, twenty or more items of information, and/or the like. Thus, the first information may be much more granular (and, thus, more focused) than using a source and a destination alone. For example, the first information may include information regarding a port associated with the source or the destination, a channel used for communicating traffic to and/or from the source or the destination, a protocol used for communicating traffic to and/or from the source or the destination, a flow associated with traffic to and/or from the source or the destination, a data center associated with the source or the destination, an edge device associated with the source or the destination, a network device to which the source or the destination communicates, an entity associated with the source or the destination, and/or the like.

In some implementations, a security rule may include a rule related to access to network 230, traffic that is permitted via network 230, and/or the like. In some implementations, a security rule may be associated with a network security policy. For example, a set of security rules may form a network security policy. In some implementations, a network security policy may include thousands, millions, billions, trillions, etc. of security rules.

In some implementations, a network security policy may have, or be associated with, an intent. For example, a network security policy may have an intent to permit all traffic associated with a source and/or destination, to deny traffic associated with a source and/or destination, to permit or deny traffic on a case-by-case basis, to permit a portion of traffic and deny another portion of traffic associated with a source and/or destination, and/or the like. In some implementations, an intent of a network security policy may be based on a set of security rules included in the network security policy. Additionally, or alternatively, an intent of a network security policy may be independent of the set of security rules included in the network security policy (e.g., based on an absence of security rules from a network security policy, information identifying a manner in which a user experience is impacted by the network security policy, input from a user of client device 220, documentation, information identifying an objective of a network security policy, etc.).

In some implementations, network device 210 may store a network security policy to be used with regard to traffic exchanged via network device 210. In some implementations, traffic may refer to a set of packets. In some implementations, a packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via network 230.

In this way, network device 210 may receive first information associated with a set of security rules, thereby permitting network device 210 to determine a manner in which the set of security rules is to apply.

As further shown in FIG. 4, process 400 may include determining a manner in which the set of security rules is to apply using the first information (block 420). For example, network device 210 may determine a manner in which the set of security rules is to apply using the first information (e.g., to permit network device 210 to determine whether the set of security rules is related to a set of previously defined security rules, whether the set of security rules conflicts with an intent of a network security policy, and/or the like, as described elsewhere herein).

In some implementations, network device 210 may determine the manner based on receiving the security rule, based on receiving an indication to determine the manner (e.g., from client device 220), after receiving first information for a threshold quantity of security rules, and/or the like. In some implementations, network device 210 may determine a manner based on input from a user of client device 220 (e.g., based on a selection from a set of predefined manners).

In some implementations, network device 210 may determine a manner using the first information associated with a security rule (e.g., where the manner is indicated by a security action, by information that identifies a source and/or destination of traffic to which the security rule is to apply, etc.). In some implementations, network device 210 may determine a manner in which a security rule is to apply by parsing first information associated with the security rule. For example, network device 210 may identify identifiers included in the first information that identify a security action network device 210 is to perform when the security rule applies to traffic, a source of traffic to which a security rule is to apply, a destination of traffic to which a security rule is to apply, and/or the like.

In some implementations, network device 210 may determine a manner by using natural language processing, text analysis, computational linguistics, and/or the like (e.g., to identify a term, a phrase, and/or the like that identifies a manner in which the security rule is to apply). For example, network device 210 may determine that a security rule is to apply to employees, or a subset of employees, based on a term and/or phrase included in the first information indicating that the security rule is to apply to employees or a subset of employees.

In some implementations, network device 210 may determine a manner by using machine learning. For example, network device 210 may determine a manner in which a security rule is to apply based on determining that the security rule is similar to a set of security rules on which network device 210 was trained (e.g., where network device 210 was trained on a data set that identifies various security rules and corresponding manners in which the various security rules are to apply).

In some implementations, when using machine learning, network device 210 may train a model to determine a manner in which a security rule is to apply. For example, network device 210 may train a model to determine a manner based on a destination of traffic to which a security rule is to apply, a source of traffic to which a security rule is to apply, a security action performed when a security rule applies, and/or the like. In some implementations, a device external to network device 210 may perform the machine learning. For example, the external device may perform machine learning for multiple network devices 210 and may provide information related to a result of the machine learning to the multiple network devices 210 to permit the network devices 210 to determine a manner. In some implementations, the multiple network devices 210 may provide information to the external device related to a result of identifying a manner in which a security rule is to apply, such as to improve the machine learning by the external device.

In some implementations, use of machine learning may permit network device 210 to identify information related to a security rule that is indicative of a manner in which a security rule is to apply. For example, network device 210 may determine that information identifying a source of traffic to which the security rule is to apply is more indicative of a manner in which the security rule is to apply than information identifying a destination of traffic to which the security rule applies. This conserves processing resources of network device 210 by permitting network device 210 to quickly and efficiently determine a manner in which a security rule is to apply. In some implementations, network device 210 may weight different information related to a security rule and may determine a manner in which the security rule is to apply using a weighted score for the security rule, an average of weights associated with different information related to the security rule, and/or the like.

In this way, network device 210 may determine a manner in which the set of security rules is to apply using the first information, so as to determine whether the set of security rules is to be added to a network security policy as a set of new security rules, as a set of exceptions to a set of previously defined security rules and/or the network security policy, and/or the like.

As further shown in FIG. 4, process 400 may include determining whether the manner in which the set of security rules is to apply and an intent of a network security policy and/or a manner in which a set of previously defined security rules is to apply match using the first information and second information associated with the set of previously defined security rules and/or the network security policy (block 430). For example, network device 210 may determine whether the manner in which the set of security rules is to apply and an intent of a network security policy match using the first information and second information associated with the network security policy. Additionally, or Alternatively, and as another example, network device 210 may determine whether the manner in which the set of security rules is to apply and a manner in which a set of previously defined security rules is to apply match using the first information and second information associated with the set of previously defined security rules.

In some implementations, network device 210 may determine whether a manner associated with a set of security rules and an intent of a network security policy and/or a manner associated with a set of previously defined security rules match to determine whether the set of security rules is related to the set of previously defined security rules, conflicts with the network security policy, and/or the like. For example, this may permit network device 210 to determine whether a set of security rules is a set of new security rules to be added to a network security policy, whether a set of security rules is an exception to a set of previously defined security rules, whether a set of previously defined security rules is to be a set of exceptions to a set of security rules received from client device 220, whether a set of security rules is to be updated, whether a first set of security rules contradicts a second set of security rules, whether a received set of security rules does not need to be added to a network security policy (e.g., based on the received set of security rules not conflicting with an intent of a network security policy), and/or the like.

In some implementations, a set of previously defined security rules may form a network security policy (e.g., stored by network device 210). In some implementations, the second information may include information similar to that described above with regard to the first information. Additionally, or alternatively, the second information may include information that identifies an intent of a network security policy (e.g., information that identifies an experience of a user that may be independent of security rules included in the network security policy). In some implementations, network device 210 may determine an intent of a network security policy and/or a manner in which a set of previously defined security rules is to apply in a manner similar to that described above with regard to block 420.

Additionally, or alternatively, and with respect to determining an intent of a network security policy, network device 210 may determine an intent of a network security policy by analyzing the network security policy. For example, network device 210 may determine a manner in which a user experience is affected by the network security policy by analyzing security rules included in the network security policy, identifying types of security rules that are not included in the network security policy, and/or the like. Continuing with the previous example, network device 210 may determine that an intent of a network security policy includes permitting all employees to access social networking sites (e.g., based on the network security policy including a security rule that permits all employees to access social networking sites, based on the network security policy lacking a security rule that restricts access to social networking sites, based on input from client device 220 that identifies that all employees are permitted to access social networking sites, etc.).

In some implementations, when determining whether a manner associated with the set of security rules and an intent of a network security policy and/or a manner associated with a set of previously defined security rules match, network device 210 may determine whether the first information and the second information, or portions thereof, match. For example, network device 210 may determine whether a set of security rules is associated with the same source, the same destination, etc. as a set of previously defined security rules, is to permit or deny traffic in a manner similar to the network security policy, and/or the like. Continuing with the previous example, network device 210 may determine that a manner associated with a set of security rules and an intent of a network security policy and/or a manner associated with a set of previously defined security rules match when the set of security rules and the set of previously defined security rules apply to the same source, the same destination, when a manner associated with a set of security rules does not conflict with an intent associated with a network security policy (e.g., does not deny traffic that the network security policy permits), etc.

Additionally, or alternatively, network device 210 may perform a weighted match of information related to a set of security rules and a network security policy and/or a set of previously defined security rules (e.g., where information identifying a source of traffic is weighted more than information identifying a destination of traffic) and may determine a match when information associated with a threshold weight matches. Additionally, or alternatively, network device 210 may determine a measure of similarity for information related to the set of security rules and the network security policy and/or the set of previously defined security rules. For example, a measure of similarity may be based on similar terms and/or phrases included in the information, the set of security rules and the network security policy and/or the set of previously defined security rules applying to similar types of sources or destinations (e.g., applications, devices, geographic locations, etc.), and/or the like. Additionally, or alternatively, network device 210 may determine a score based on an amount of information that matches between the set of security rules and the network security policy and/or the set of previously defined security rules and may determine a match when the score satisfies a threshold.

In some implementations, network device 210 may determine that a manner associated with a set of security rules and an intent of a network security policy and/or a manner associated with a set of previously defined security rules do not match when the first information and the second information do not match. For example, network device 210 may determine that a manner associated with a set of security rules and an intent of a network security policy and/or a manner associated with a set of previously defined security rules do not match when the set of security rules and the network security policy and/or the set of previously defined security rules apply to different sources of traffic, different destinations of traffic, cause different security actions to be implemented, when the set of security rules conflicts with an intent of a network security policy (e.g., by denying traffic that the network security policy is intended to permit), and/or the like.

In some implementations, network device 210 may determine whether a set of security rules and a set of previously defined security rules are related (e.g., where a set of security rules may be a set of exceptions to a set of previously defined security rules, or vice versa) and/or whether the set of security rules conflicts with a network security policy (e.g., where the set of security rules are to be added to the network security policy as an exception to the network security policy). For example, network device 210 may determine that a set of security rules and a set of previously defined security rules are related when a threshold amount of the first information and the second information match. Additionally, or alternatively, and as another example, network device 210 may determine that a set of security rules conflicts with a network security policy when the set of security rules permits or denies traffic in a manner different than the network security policy, modifies a user experience associated with the network security policy, and/or the like.

In some implementations, network device 210 may determine that a set of security rules and a set of previously defined security rules are related and/or that a set of security rules and a network security policy do not conflict when a set of security rules and a set of previously defined security rules and/or a network security policy apply to the same type of destination of traffic, the same type of source of traffic, are associated with a similar security action, would not modify a user experience, and/or the like. For example, network device 210 may determine that a set of security rules and a set of previously defined security rules are related and/or that a set of security rules and a network security policy do not conflict when the set of security rules and the set of previously defined security rules and/or the network security policy apply to employees, even if those apply to different employees, different types of employees, one applies to employees generally and another applies to a subset of employees, etc. (e.g., when the first information and the second information partially match).

Additionally, or alternatively, and as another example, network device 210 may determine that a set of security rules and a set of previously defined security rules are related and/or that a set of security rules and a network security policy do not conflict when the set of security rules and the set of previously defined security rules both apply to traffic to/from applications, even if both apply to different applications, different types of applications, one applies to applications generally and the other applies to a subset of applications, etc., and/or the like (e.g., when the first information and the second information partially match). In this way, network device 210 may determine that a set of security rules and a set of previously defined security rules are related and/or that a set of security rules and a network security policy do not conflict when the first information and the second information partially match. This improves an accuracy of analyzing a set of security rules and a related set of previously defined security rules and/or a network security policy.

In some implementations, network device 210 may determine whether a set of security rules is to be added to a network security policy as a set of new security rules (e.g., by determining whether to modify information associated with a network security policy to include information identifying the set of security rules as a set of new security rules). For example, network device 210 may determine that a set of security rules is to be added to a network security policy as a set of new security rules when network device 210 determines that a manner in which the set of security rules is to apply does not match a manner in which a set of previously defined security rules is to apply, that the set of security rules is not related to a set of previously defined security rules (e.g., when a threshold amount of the first information and the second information do not match), that the set of security rules conflicts with an intent of the network security policy, and/or the like.

In some implementations, network device 210 may determine whether a set of security rules is to be included in a network security policy as a set of exceptions to a set of previously defined security rules (e.g., may determine whether to modify information related to the network security policy such that the information identifies the set of security rules as a set of exceptions to the set of previously defined security rules) and/or as an exception to a network security policy. For example, network device 210 may determine that a set of security rules is to be included in a network security policy as a set of exceptions to the set of previously defined security rules when network device 210 determines that the set of security rules and the set of previously defined security rules are related but that the set of security rules applies to a subset of the traffic to which the set of previously defined security rules applies.

Continuing with the previous example, network device 210 may determine that a set of security rules is a set of exceptions to a set of previously defined security rules when the set of previously defined security rules applies to traffic to/from a set of applications and the set of security rules applies to traffic to/from a subset of applications. Additionally, or alternatively, and as another example, network device 210 may determine that a set of security rules is to be added to a network security policy as an exception to the network security policy based on determining that the manner in which the set of security rules is to apply conflicts with an intent of the network security policy. Conversely, and as another example, network device 210 may determine that the set of security rules is not to be added to the network security policy when the set of security rules does not conflict with an intent of a network security policy (e.g., would not modify a user experience defined by the network security policy). In some implementations, network device 210 may determine that a set of previously defined security rules is a set of exceptions to a set of received security rules in a similar manner.

In this way, network device 210 may determine whether the manner in which the set of security rules is to apply and an intent of a network security policy and/or a manner in which a set of previously defined security rules is to apply match prior to performing an action related to the network security policy, the set of security rules, and/or the set of previously defined security rules.

As further shown in FIG. 4, process 400 may include performing an action based on determining whether the manner in which the set of security rules is to apply and the intent of the network security policy and/or the manner in which the set of previously defined security rules is to apply match (block 440). For example, network device 210 may perform an action based on determining whether the manner in which the set of security rules is to apply and the intent of the network security policy and/or the manner in which the set of previously defined security rules is to apply match. In some implementations, network device 210 may perform the action after determining whether the manner associated with the set of security rules and the intent of the network security policy and/or the manner associated with the set of previously defined security rules match, based on receiving an indication to perform the action (e.g., from client device 220), and/or the like.

In some implementations, when performing the action, network device 210 may include the set of security rules in a network security policy with the set of previously defined security rules. For example, network device 210 may include the set of security rules in such a manner that a relationship between the set of security rules and the set of previously defined security rules can be determined (e.g., by modifying information associated with the network security policy to identify the relationship). Continuing with the previous example, network device 210 may generate a rule identifier and/or a sub-rule identifier like "1" for a previously defined security rule and "1.1" for a security rule being added to the network security policy, where "1.1" indicates that the security rule is related to (e.g., an exception of) the previously defined security rule associated with the identifier "1."

Additionally, or alternatively, when performing the action, network device 210 may request confirmation to include the set of security rules in a network security policy, and/or the manner in which to include the set of security rules, from a user of client device 220 (e.g., by providing information for display via client device 220). Additionally, or alternatively, when performing the action, network device 210 may use the set of security rules to filter traffic. For example, network device 210 may use a network security policy to which the set of security rules were added to filter traffic (e.g., deny traffic, permit traffic, log traffic, reroute traffic, quarantine traffic, etc.). Additionally, or alternatively, when performing the action, network device 210 may generate a report related to the set of security rules, a determined intent of a set of security rules, a manner in which the set of security rules modifies an intent of a set of previously defined security rules, and/or the like. Additionally, or alternatively, when performing the action, network device 210 may provide a generated report for display (e.g., via client device 220). Additionally, or alternatively, when performing the action, network device 210 may configure one or more other network devices, update a server, and/or the like based on the set of security rules.

In this way, network device 210 may perform an action based on determining whether the manner in which the set of security rules is to apply and the intent of the network security policy and/or the manner in which the set of previously defined security rules is to apply match.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
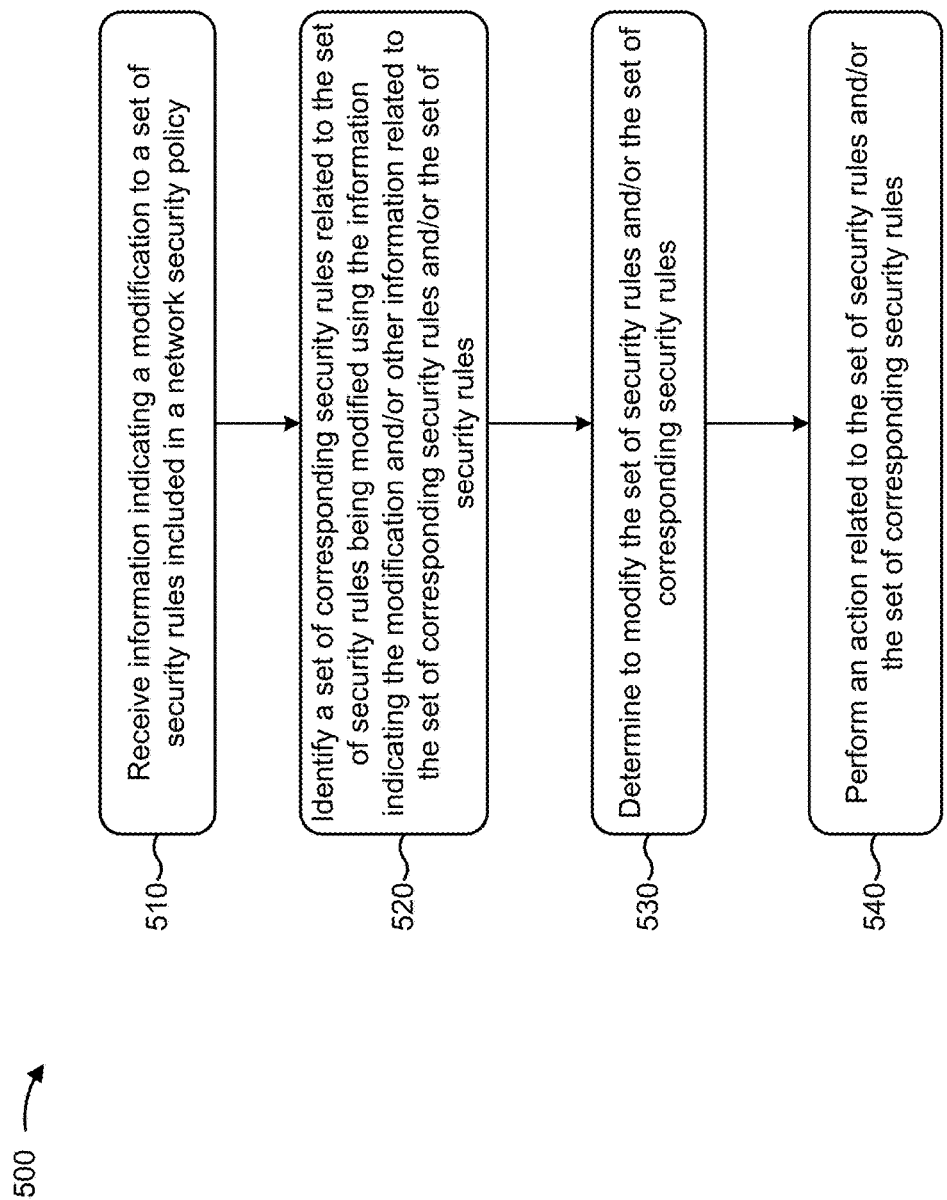
FIG. 5 is a flow chart of an example process for an intent-based network security policy modification.

FIG. 5 is a flow chart of an example process 500 for an intent-based network security policy modification. In some implementations, one or more process blocks of FIG. 5 may be performed by network device 210. In some implementations, one or more process blocks of FIG. 5 may be performed by another device or a group of devices separate from or including network device 210, such as client device 220. FIG. 5 shows an example process related to receiving a modification to a set of security rules and determining an additional set of security rules that may need to be modified based on the modification to the set of security rules.

As shown in FIG. 5, process 500 may include receiving information indicating a modification to a set of security rules included in a network security policy (block 510). For example, network device 210 may receive information indicating a modification to a set of security rules included in a network security policy. In some implementations, network device 210 may receive the information periodically, according to a schedule, based on input from a user of client device 220, based on requesting the information, and/or the like.

In some implementations, a modification may include a modification to information associated with a set of security rules such as to a manner in which a set of security rules is to apply, to remove of a set of security rules from a network security policy, to modify an intent of a network security policy, and/or the like. For example, a modification may include a modification to a destination and/or a source to which a set of security rules applies, an action to be performed when a set of security rules applies to traffic, and/or the like. In some implementations, network device 210 may receive modifications to thousands, millions, billions, etc. of security rules, thereby receiving an indication to modify a set of security rules that cannot be processed manually or objectively by a human actor.

In this way, network device 210 may receive information indicating a modification to a set of security rules included in a network security policy, prior to identifying a set of corresponding security rules related to the set of security rules being modified.

As further shown in FIG. 5, process 500 may include identifying a set of corresponding security rules related to the set of security rules being modified using the information indicating the modification and/or other information related to the set of corresponding security rules and/or the set of security rules (block 520). For example, network device 210 may identify a set of corresponding security rules related to the set of security rules being modified using the information identifying the modification and/or other information related to the set of corresponding security rules and/or the set of security rules (e.g., so that network device 210 can modify the set of corresponding security rules based on the modification to the set of security rules). In some implementations, network device 210 may identify thousands, millions, billions, etc. of security rules that correspond to thousands, millions, billions, etc. of other security rules. In this way, network device 210 may process a quantity of security rules that cannot be processed manually or objectively by human actors.

In some implementations, network device 210 may identify a set of corresponding security rules using one or more techniques. For example, network device 210 may identify a set of corresponding security rules based on an identifier that indicates a first security rule and a second security rule are related (e.g., that indicates the first security rule is an exception to the second security rule similar to the identifiers "1" and "1.1" described above).

In some implementations, network device 210 may identify a set of corresponding security rules based on a manner in which the set of corresponding security rules is to apply and/or a manner in which a set of security rules is to apply. For example, network device 210 may determine a manner in which a set of security rules being modified is to apply and may identify a set of corresponding security rules where the manner in which the set of security rules being modified is to apply and a manner in which another set of security rules is to apply match. The various ways in which network device 210 may determine whether a manner in which a set of security rules is to apply matches a manner in which another set of security rules is to apply are described in FIG. 4. In some implementations, network device 210 may determine a manner in which a set of security rules and/or another set of security rules is to apply in a manner similar to that described elsewhere herein.

In some implementations, network device 210 may identify a set of corresponding security rules based on input from a user of client device 220 that identifies a set of corresponding security rules. For example, when network device 210 receives information identifying a modification to a set of security rules, network device 210 may receive information identifying a set of corresponding security rules (e.g., a set of exceptions related to the set of security rules being modified, a set of security rules to which the set of security rules being modified is an exception, etc.).

In some implementations, network device 210 may provide information that identifies a set of security rules and/or a set of corresponding security rules for display via client device 220 (e.g., after network device 210 identifies the set of corresponding security rules). For example, network device 210 may provide information for display to request confirmation from a user of client device 220 that network device 210 accurately identified a set of corresponding security rules. In some implementations, network device 210 may store information related to a set of security rules being modified and a set of corresponding security rules that network device 210 identified, such as to improve future identifications of a set of corresponding security rules (e.g., by network device 210 and/or another network device 210).

In this way, network device 210 may identify a set of corresponding security rules related to the set of security rules being modified using the information identifying the modification and/or other information related to the set of corresponding security rules and/or the set of security rules, to permit network device 210 to determine to modify the set of security rules and/or the set of corresponding security rules.

As further shown in FIG. 5, process 500 may include determining to modify the set of security rules and/or the set of corresponding security rules (block 530). For example, network device 210 may determine to modify the set of security rules and/or the set of corresponding security rules (e.g., so that the set of corresponding security rules and the set of security rules being modified are consistent). In some implementations, network device 210 may determine to modify thousands, millions, billions, etc. of security rules and/or corresponding security rules, thereby determining to process a set of security rules and/or corresponding security rules that cannot be processed manually or objectively by a human actor.

In some implementations, network device 210 may determine to modify the set of security rules and/or the set of corresponding security rules based on a manner in which the set of corresponding security rules is to apply relative to the modification. For example, network device 210 may determine that a set of corresponding security rules is no longer needed based on a modification to a set of security rules. Continuing with the previously example, if a modification changes a set of security rules from denying social media traffic to permitting social media traffic, then network device 210 may determine that a set of corresponding security rules that permits social media traffic for a particular employee is no longer needed (e.g., due to a manner in which the set of security rules is to apply being changed from denying social media traffic to permitting social media traffic). In this case, network device 210 may determine that the set of corresponding security rules is to be modified or removed from a network security policy.

Additionally, or alternatively, and as another example, network device 210 may determine that a set of corresponding security rules conflicts with a modification to a set of security rules. Continuing with the previous example, if a modification to a set of security rules permits social media traffic for a particular employee, then network device 210 may determine that a set of corresponding security rules that denies social media traffic for the particular employee conflicts with the modification to the set of security rules and is to be modified or removed from a network security policy.

In some implementations, network device 210 may determine to modify a set of security rules and/or a set of corresponding security rules based on a modification to a set of security rules. For example, network device 210 may determine to modify a set of corresponding security rules to include the same modification as was made to a set of security rules, may determine to modify a set of corresponding security rules such that the set of corresponding security rules no longer conflicts with the set of security rules after the modification, and/or the like. In some implementations, when modifying a set of security rules and/or a set of corresponding security rules, network device 210 may modify information included in a network security policy (e.g., information in a data structure that stores information related to a set of security rules that form the network security policy), as described elsewhere herein.

In some implementations, network device 210 may determine to modify the set of security rules and/or the set of corresponding security rules based on requesting and/or receiving an indication from a user of client device 220 to modify the set of security rules and/or the set of corresponding security rules. For example, network device 210 may request and/or receive an indication, from a user of client device 220, related to which sets of security rules and/or sets of corresponding security rules to modify. Additionally, or alternatively, and as another example, network device 210 may provide information for display that indicates a modification to a set of security rules and/or a set of corresponding security rules that are to be modified and may request confirmation of the modification from a user of network device 210.

In some implementations, network device 210 may determine to remove a set of security rules. For example, network device 210 may determine to remove a set of corresponding security rules if the set of corresponding security rules is no longer needed and/or conflicts with a set of modified security rules. This conservers memory resources of network device 210 by reducing a quantity of security rules that network device 210 stores. In addition, this conserves processing resources of network device 210 by reducing a quantity of security rules that network device 210 has to process when using a network security policy to process traffic.

In this way, network device 210 may determine to modify the set of security rules and/or the set of corresponding security rules, prior to performing an action related to the set of security rules and/or the set of corresponding security rules.

As further shown in FIG. 5, process 500 may include performing an action related to the set of security rules and/or the set of corresponding security rules (block 540). For example, network device 210 may perform an action related to the set of security rules and/or the set of corresponding security rules. In some implementations, network device 210 may perform an action related to thousands, millions, billions, etc. of security rules and/or corresponding security rules, thereby processing a set of security rules that cannot be processed manually or objectively by a human actor.

In some implementations, for example, network device 210 may modify a set of security rules and/or a set of corresponding security rules (e.g., a set of exceptions to a set of security rules), such as by modifying information related to the set of security rules and/or the set of corresponding security rules. Additionally, or alternatively, and as another example, network device 210 may generate a report indicating a manner in which a set of security rules and/or a set of corresponding security rules were modified. Additionally, or alternatively, and as another example, network device 210 may provide the report for display via client device 220. Additionally, or alternatively, and as another example, network device 210 may store information related to a modification (e.g., to permit network device 210 to reverse a modification, to recommend a modification to another set of security rules and/or another set of corresponding security rules, to permit another network device 210 to recommend a modification to a set of security rules and/or a set of corresponding security rules, etc.).

In this way, network device 210 may perform an action related to the set of security rules and/or the set of corresponding security rules.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for intent-based network security policy modification. In some implementations, one or more process blocks of FIG. 6 may be performed by network device 210. In some implementations, one or more process blocks of FIG. 6 may be performed by another device or a group of devices separate from or including network device 210, such as client device 220. FIG. 6 shows an example process related to mapping security rules of a network security policy (e.g., organizing a network security policy such that security rules and corresponding exceptions are mapped).

As shown in FIG. 6, process 600 may include receiving an indication to map a set of security rules and a set of corresponding security rules related to the set of security rules (block 610). For example, network device 210 may receive an indication to map a set of security rules and a set of corresponding security rules related to the set of security rules. In some implementations, network device 210 may receive the indication periodically, according to a schedule, based on input from a user of client device 220, based on requesting input from a user of client device 220, and/or the like.

In some implementations, the indication may include an indication to map a set of security rules included in a network security policy. For example, the indication may include an indication to map security rule exceptions to corresponding security rules. In some implementations, network device 210 may receive an indication to map thousands, millions, billions, etc. of security rules. In this way, network device 210 may receive an indication to map a set of security rules that cannot be mapped manually or objectively by a human actor.

In this way, network device 210 may receive an indication to map a set of security rules and a set of corresponding security rules related to the set of security rules, prior to determining a manner in which the set of security rules is to apply and a manner in which a set of corresponding security rules is to apply.

As further shown in FIG. 6, process 600 may include determining a manner in which the set of security rules is to apply and/or a manner in which the set of corresponding security rules is to apply using information related to the set of security rules and/or the set of corresponding security rules (block 620). For example, network device 210 may determine a manner in which the set of security rules is to apply and a manner in which the set of corresponding security rules is to apply using information related to the set of security rules and/or the set of corresponding security rules. In some implementations, network device 210 may determine a manner in which the set of security rules is to apply and/or a manner in which the set of corresponding security rules is to apply in a manner similar to that described above with respect to FIG. 4. In some implementations, network device 210 may determine a manner in which a set of security rules is to apply and/or a manner in which a set of corresponding security rules is to apply to permit network device 210 to identify a set of corresponding security rules that are related to a set of security rules.

In some implementations, network device 210 may determine a manner associated with thousands, millions, billions, etc. of security rules. In this way, network device 210 may determine a manner associated with a set of security rules that cannot be processed manually or objectively by a human actor.

In this way, network device 210 may determine a manner in which the set of security rules is to apply and/or a manner in which the set of corresponding security rules is to apply using information related to the set of security rules and/or the set of corresponding security rules.

As further shown in FIG. 6, process 600 may include mapping the set of security rules and the set of corresponding security rules based on the manner in which the set of security rules is to apply and/or the manner in which the set of corresponding security rules is to apply (block 630). For example, network device 210 may map the set of security rules and the set of corresponding security rules based on the manner in which the set of security rules is to apply and/or the manner in which the set of corresponding security rules is to apply. In some implementations, network device 210 may map thousands, millions, billions, etc. of security rules. In this way, network device 210 may map a set of security rules that cannot be mapped manually or objectively by a human actor.

In some implementations, when mapping the set of security rules and the set of corresponding security rules, network device 210 may determine whether two or more security rules are related. For example, network device 210 may determine that two or more security rules are related based on the two or more security rules applying to the same source of traffic, the same destination of traffic, based on a security rule applying to a subset of traffic of another security rule, and/or the like, as described elsewhere herein.

In some implementations, when mapping a set of security rules and a set of corresponding security rules, network device 210 may map related security rules. For example, network device 210 may map a first security rule and a second security rule when the first security rule and the second security rule are related, such as when the first security rule applies to a subset of the same traffic as the second security rule (e.g., the first security rule may be an exception to the second security rule).

In this way, network device 210 may map the set of security rules and the set of corresponding security rules based on the manner in which the set of security rules is to apply and/or the manner in which the set of corresponding security rules is to apply, prior to performing an action related to the set of security rules and/or the set of corresponding security rules.

As further shown in FIG. 6, process 600 may include performing an action related to the set of security rules and/or the set of corresponding security rules based on mapping the set of security rules and the set of corresponding security rules (block 640). For example, network device 210 may perform an action related to the set of security rules and/or the set of corresponding security rules based on mapping the set of security rules and the set of corresponding security rules. In some implementations, network device 210 may perform an action related to thousands, millions, billions, etc. of security rules and/or corresponding security rules. In this way, network device 210 may perform an action related to a set of security rules that cannot be processed manually or objectively by a human actor.

In some implementations, for example, network device 210 may modify a network security policy to include information that identifies the set of security rules and/or the set of corresponding security rules related to the set of security rules. For example, network device 210 may modify a network security policy to include information that identifies that a first security rule is an exception to a second security rule (e.g., similar to the rule identifier and sub-rule identifier described above).

Additionally, or alternatively, and as another example, network device 210 may generate a report indicating a mapping of a set of security rules and a set of corresponding security rules. In this case, network device 210 may provide the report to client device 220 for display via client device 220. Additionally, or alternatively, and as another example, network device 210 may store information related to mapping a set of security rules and/or a set of corresponding security rules (e.g., to permit network device 210 to reverse a mapping, to improve future mappings, to improve future mappings of another network device 210, etc.).

In this way, network device 210 may perform an action related to the set of security rules and/or the set of corresponding security rules based on mapping the set of security rules and the set of corresponding security rules.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. In addition, although described separately, FIGS. 4, 5, and 6 may be performed concurrently, sequentially, at different times, at the same time, in order, out of order, etc.

Some implementations, described herein, provide a network device that is capable of determining an intent of various security rules associated with a network security policy and mapping the various security rules, such that security rule exceptions are mapped to corresponding security rules, a first security rule is mapped to a second security rule that is related to the first security rule, and/or the like. This facilitates improved management of the network security policy via tracking of changes to an intent of the network security policy, thereby improving security of a network associated with the network security policy. In addition, this conserves processing resources that would otherwise be consumed due to reduced network security and/or use of a network in an unintended manner. Further, this increases an efficiency of analyzing a network security policy, such as to determine a manner in which an intent of a network security policy has changed, when a network is under attack (e.g., to permit a network device or a network administrator to quickly identify and modify a security rule during an attack), and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, operatively coupled to the one or more memories, to:
   receive first information associated with a set of security rules,
      the first information being received from another device and to be used to modify a network security policy,
      the network security policy including a set of previously defined security rules;
   determine, using a machine learning model, a manner in which the set of security rules is to apply using the first information,
      the manner in which the set of security rules is to apply to be used to determine whether the set of security rules is related to the set of previously defined security rules;
   determine, using the machine learning model, whether the manner in which the set of security rules is to apply and a manner in which the set of previously defined security rules is to apply match by:
      parsing the first information and second information to identify source traffic criteria, destination traffic criteria, and security action information for the set of security rules and the set of previously defined security rules,
      comparing the source traffic criteria, the destination traffic criteria, and the security action information for the set of security rules to the source traffic criteria, the destination traffic criteria, and the security action information with the set of previously defined security rules,
         the second information being associated with the set of previously defined security rules,
      determining a score based on an amount of the source traffic criteria, the destination traffic criteria, and the security action information that matches between the set of security rules and the set of previously defined security rules, and
      determining that the manner in which the set of security rules is to apply and a manner in which the set of previously defined security rules is to apply match when the score satisfies a threshold; and
   perform an action based on determining whether the manner in which the set of security rules is to apply and the manner in which the set of previously defined security rules is to apply match,
      the action relating to modifying the network security policy based on the set of security rules.

2. The device of claim 1, where the one or more processors are further to:
   receive third information that indicates a modification to a subset of security rules included in the network security policy;
   identify a set of corresponding security rules related to the subset of security rules using the first information, the second information, or the third information,
      the set of corresponding security rules including one or more of the set of security rules or one or more of the set of previously defined security rules; and
   determine to modify the subset of security rules or the set of corresponding security rules.

3. The device of claim 1, where the one or more processors are further to:
   map a subset of security rules and a set of corresponding security rules included in the network security policy,
      the set of corresponding security rules including one or more of the set of security rules or the set of previously defined security rules.

4. The device of claim 1, where the one or more processors, when determining the manner in which the set of security rules is to apply, are to:
   determine the manner in which the set of security rules is to apply using input from a user of the other device.

5. The device of claim 1, where the one or more processors are further to:
   determine whether the set of security rules and the set of previously defined security rules are related or whether the set of security rules conflicts with the network security policy based on determining whether the manner in which the set of security rules is to apply and the manner in which the set of previously defined security rules is to apply match.

6. The device of claim 1, where the one or more processors, when performing the action, are to at least one of:
   modify the network security policy to include information identifying the set of security rules;
   generate a rule identifier for a previously defined security rule and a corresponding sub-rule identifier for a security rule being added to the network security policy, where the corresponding sub-rule identifier for the security rule indicates that the security rule is related to the previously defined security rule associated with the rule identifier;
   request confirmation to include the set of security rules in the network security policy; or
   filter traffic, based on the network security policy, after one or more of the set of security rules have been added to the network security policy.

7. A non-transitory computer-readable medium storing instructions, the instructions comprising:
   one or more instructions that, when executed by one or more processors, cause the one or more processors to:
   receive first information associated with a set of security rules,
     the first information identifying:
       traffic to which the set of security rules is to apply, or
       a set of security actions a device is to implement when the set of security rules applies to traffic;
   determine, using a machine learning model, a manner in which the set of security rules is to apply using the first information,
     the manner in which the set of security rules is to apply being determined using a technique to process the first information;
   determine, using the machine learning model, whether the manner in which the set of security rules is to apply and a manner in which a set of previously defined security rules is to apply match, by:
     parsing the first information and second information to identify source traffic criteria, destination traffic criteria, and security action information for the set of security rules and the set of previously defined security rules,
     comparing the source traffic criteria, the destination traffic criteria, and the security action information for the set of security rules with the source traffic criteria, the destination traffic criteria, and the security action information for the set of previously defined security rules,
       the second information being associated with the set of previously defined security rules,
     determining a score based on an amount of the source traffic criteria, the destination traffic criteria, and the security action information that matches between the set of security rules and the set of previously defined security rules, and
     determining that the manner in which the set of security rules is to apply and a manner in which the set of previously defined security rules is to apply match when the score satisfies a threshold; and
   perform an action based on determining whether the manner in which the set of security rules is to apply and the manner in which the set of previously defined security rules is to apply match,
     the action relating to modifying a network security policy that includes the set of previously defined security rules, based on the set of security rules.

8. The non-transitory computer-readable medium of claim 7, where the one or more instructions, when executed by the one or more processors, further cause the one or more processors to:
   analyze the first information to determine information that identifies the manner in which the set of security rules is to apply.

9. The non-transitory computer-readable medium of claim 7, where the one or more instructions, when executed by the one or more processors, further cause the one or more processors to:
   determine whether to modify information related to the network security policy to include information identifying the set of security rules as a set of new security rules; and
   where the one or more instructions, that cause the one or more processors to perform the action, cause the one or more processors to at least one of:
   perform the action after determining whether to modify the information related to the network security policy;
   generate a rule identifier for a previously defined security rule and a corresponding sub-rule identifier for a security rule being added to the network security policy, where the corresponding sub-rule identifier for the security rule indicates that the security rule is related to the previously defined security rule associated with the rule identifier;
   request confirmation to include the set of security rules in the network security policy; or
   filter traffic, based on the network security policy, after one or more of the set of security rules have been added to the network security policy.

10. The non-transitory computer-readable medium of claim 7, where the one or more instructions, when executed by the one or more processors, further cause the one or more processors to:
    receive second information that indicates a modification to a subset of security rules included in the network security policy; and
    identify a set of corresponding security rules related to the subset of security rules using the first information, the second information, or third information associated with the set of previously defined security rules.

11. The non-transitory computer-readable medium of claim 7, where the one or more instructions, when executed by the one or more processors, further cause the one or more processors to:
    receive an indication to map a subset of security rules and a set of corresponding security rules; and
    map the subset of security rules and the set of corresponding security rules.

12. The non-transitory computer-readable medium of claim 7, where the one or more instructions, when executed by the one or more processors, further cause the one or more processors to:

determine whether the set of security rules is to be included in the network security policy as a set of exceptions to the set of previously defined security rules; and where the one or more instructions, that cause the one or more processors to perform the action, cause the one or more processors to:
perform the action after determining whether the set of security rules is to be included in the network security policy as the set of exceptions.

13. The non-transitory computer-readable medium of claim 7, where the one or more instructions, that cause the one or more processors to perform the action, cause the one or more processors to:
generate a report related to the set of security rules or the set of previously defined security rules; and
provide the report to another device for display.

14. A method, comprising:
receiving, by a device, first information associated with a set of security rules,
the first information permitting identification of:
traffic to which the set of security rules applies, or
a set of security actions the device is to perform with respect to the traffic;
determining, by the device, using a machine learning model, a manner in which the set of security rules is to apply using the first information;
determining, by the device, using the machine learning model, whether the manner in which the set of security rules is to apply and a manner in which a set of previously defined security rules is to apply match
by:
parsing the first information and second information associated with the set of previously defined security rules to identify source traffic criteria, destination traffic criteria, and security action information for the set of security rules and the set of previously defined security rules,
comparing the source traffic criteria, the destination traffic criteria, and the security action information for the set of security rules with the source traffic criteria, the destination traffic criteria, and the security action information for the set of previously defined security rules,
determining a score based on an amount of the first information that matches with the second information, and
determining that the manner in which the set of security rules is to apply and a manner in which the set of previously defined security rules is to apply match when the score satisfies a threshold;
and
performing, by the device, an action based on determining whether the manner in which the set of security rules is to apply and the manner in which the set of previously defined security rules is to apply match.

15. The method of claim 14, further comprising:
determining whether the set of security rules and the set of previously defined security rules are related based on determining whether the manner in which the set of security rules is to apply and the manner in which the set of previously defined security rules is to apply match.

16. The method of claim 14, where determining the manner in which the set of security rules is to apply comprises:
determining the manner in which the set of security rules is to apply using a natural language processing technique to identify a term or a phrase included in the first information.

17. The method of claim 14, where performing the action comprises at least one of:
modifying information related to a network security policy that includes the set of previously defined security rules, to identify a relationship between the set of security rules and the set of previously defined security rules;
generating a rule identifier for a previously defined security rule and a corresponding sub-rule identifier for a security rule being added to the network security policy, where the corresponding sub-rule identifier for the security rule indicates that the security rule is related to the previously defined security rule associated with the rule identifier;
requesting confirmation to include the set of security rules in the network security policy; or
filtering traffic, based on the network security policy, after one or more of the set of security rules have been added to the network security policy.

18. The method of claim 14, further comprising:
identifying a set of corresponding security rules related to a subset of security rules using the first information or the second information.

19. The method of claim 14, further comprising:
mapping a subset of security rules and a set of corresponding security rules to permit identification of a relationship between the subset of security rules and the set of corresponding security rules.

20. The device of claim 1, wherein determining the score based on an amount of the source traffic criteria, the destination traffic criteria, and the security action information that matches, between the set of security rules and the set of previously defined security rules, is based at least in part on a measure of similarity for information related to the set of security rules and the set of previously defined security rules.

* * * * *